US007996025B2

(12) United States Patent  
Lee (10) Patent No.: US 7,996,025 B2  
(45) Date of Patent: Aug. 9, 2011

(54) METHOD AND SYSTEM FOR TRANSMITTING SHORT MESSAGE SERVICE USING MESSENGER, AND COMPUTER READABLE RECORDING MEDIUM RECORDING PROGRAM FOR IMPLEMENTING THE METHOD

(75) Inventor: Choong Hoon Lee, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 1023 days.

(21) Appl. No.: 11/816,169

(22) PCT Filed: Mar. 22, 2006

(86) PCT No.: PCT/KR2006/001037  
§ 371 (c)(1),  
(2), (4) Date: Aug. 13, 2007

(87) PCT Pub. No.: WO2006/101341  
PCT Pub. Date: Sep. 28, 2006

(65) Prior Publication Data  
US 2008/0268884 A1 Oct. 30, 2008

(30) Foreign Application Priority Data  
Mar. 25, 2005 (KR) .......................... 10-2005-0025008

(51) Int. Cl.  
*H04W 4/00* (2009.01)  
*G06F 15/16* (2006.01)  
(52) U.S. Cl. ......... 455/466; 709/206; 709/246; 709/236  
(58) Field of Classification Search .................. 455/466  
See application file for complete search history.

(56) References Cited

U.S. PATENT DOCUMENTS

| 2003/0220979 A1* | 11/2003 | Hejl .............................. 709/206 |
| 2005/0021339 A1* | 1/2005 | Ruetschi ....................... 704/269 |
| 2005/0114533 A1* | 5/2005 | Hullfish et al. ............... 709/230 |
| 2005/0188029 A1* | 8/2005 | Asikainen et al. ........... 709/206 |
| 2006/0128404 A1* | 6/2006 | Klassen et al. ................ 455/466 |

FOREIGN PATENT DOCUMENTS

| KR | 10-2001-0057674 | 7/2001 |
| KR | 10-2005-0040037 | 5/2005 |
| KR | 10-2005-0099909 | 10/2005 |

* cited by examiner

*Primary Examiner* — Lester Kincaid  
*Assistant Examiner* — Yu (Andy) Gu  
(74) *Attorney, Agent, or Firm* — H.C. Park & Associates, PLC (57) ABSTRACT

A method of transmitting an SMS message using a messenger, the method including: generating a predetermined SMS transmission area associated with an SMS transmission; providing a user with a messenger chat window including the generated SMS transmission area; displaying a received message in a display area of the messenger chat window when the message is received through an input area of the messenger chat window from the user; calculating a capacity of a selected message when the displayed message is selected by the user: dividing the message into a plurality of massages according to a predetermined reference capacity when the message capacity exceeds the reference capacity; displaying the divided message and the divided message capacity in the input area; and transmitting the SMS message including the message when a request for transmitting the message is received from the user, and a system using the method is provided.

10 Claims, 8 Drawing Sheets

METHOD AND SYSTEM FOR TRANSMITTING SHORT MESSAGE SERVICE USING MESSENGER, AND COMPUTER READABLE RECORDING MEDIUM RECORDING PROGRAM FOR IMPLEMENTING THE METHOD

CROSS REFERENCE TO RELATED APPLICATIONS

This application is a U.S. National Phase Application of International Application PCT Application No. PCT/KR2006/001037 filed on Mar. 22, 2006, which claims the benefit of priority from Korean Patent Application No. 10-2005-0025008 filed on Mar. 25, 2005. The disclosures of International Application PCT Application No. PCT/KR2006/001037 and Korean Patent Application No. 10-2005-0025008 are incorporated herein by reference.

TECHNICAL FIELD

The present invention relates to a method of transmitting an SMS (short message service) message using a messenger, and more particularly, to a method of transmitting an SMS message which provides a user with a messenger chat window including an SMS transmission area, calculates a capacity of the selected message which has been received through the messenger chat window, and when the message capacity exceeds predetermined reference capacity, the selected message is divided into a plurality of messages and transmitted, and a system using the method.

BACKGROUND ART

Recently, together with advances in information technology, a mobile terminal has been widely proliferated, and thus, an SMS using a mobile terminal has become popularized. The SMS is a type of service which can transmit approximately 80 KB, a predetermined size of a message capacity, of a message through a mobile communication network, deliver a message almost simultaneously with transmitting of the message, and transmit a message regardless of locations, unlike a voice telephony service.

With amazingly increased use of the SMS, currently not only an SMS transmission through a mobile terminal, but also an SMS transmission through a PC (personal computer) and the like is provided. Particularly, an SMS transmission using a messenger program capable of transmitting/receiving an instant message is widely used among users.

In an SMS transmission using a conventional messenger, an SMS is able to be transmitted only through a predetermined SMS transmission window, not through a messenger chat window. Namely, when a user wants to transmit a predetermined message which has been transmitted/received through the messenger chat window to a mobile terminal of a user who is not participating in a chat, the user needs to additionally log into another SMS transmission window regardless of the messenger chat window and needs to re-write the message to be transmitted or needs to copy and paste the message in the another SMS transmission window, after performing the above operations, and subsequently, the SMS transmission is possible. Accordingly, the SMS transmission using the conventional messenger has a defect in that the SMS transmission is very inconvenient for users since the transmission operations are complex, therefore an SMS transmission has not frequently occurred in the conventional messenger.

Accordingly, a new technique is desired to effectively solve the defect occurring in an SMS transmission using the conventional messenger.

DISCLOSURE OF INVENTION

Technical Goals

The present invention is conceived to outperform the aforementioned conventional art. Thus, the present invention provides a method of transmitting an SMS message using a messenger and a system using the method and can provide a user with a messenger chat window including an SMS transmission area; calculate a capacity of a selected message which has been received through the messenger chat window; divide the selected message into a plurality of messages according to a predetermined reference capacity when the message capacity exceeds the reference capacity; and transmit the SMS message, and a system using the method.

The present invention is conceived to outperform the aforementioned conventional art. Thus, the present invention provides a method of transmitting an SMS using a messenger and a system using the method that can transmit an SMS message even through a messenger chat window without logging into an additional SMS transmission window, so that user convenience is increased while transmitting the SMS message.

The present invention is conceived to outperform the aforementioned conventional art. Thus, the present invention provides a method of transmitting an SMS message using a messenger and a system using the method that can divide a message into a plurality of messages according to a predetermined reference capacity when the message exceeds the reference capacity, and display the divided messages so that a user is able to readily check transmission times and transmission fees.

Technical Solutions

To achieve the above objectives and solve the above described problems in the conventional art, according to an aspect of the present invention, there is provided a method of transmitting an SMS message using a messenger, the method including: generating a predetermined SMS transmission area associated with an SMS transmission; providing a user with a messenger chat window including the generated SMS transmission area; displaying a received message in a display area of the messenger chat window when the message is received through an input area of the messenger chat window from the user; calculating a capacity of a selected message when the displayed message is selected by the user; dividing the message into a plurality of messages according to a predetermined reference capacity when the message capacity exceeds the reference capacity; displaying the divided message and the divided message capacity in the input area; and transmitting the SMS message including the message when a request for transmitting the message is received from the user.

According to another aspect of the present invention, there is provided a method of transmitting an SMS message using a messenger, the method including: providing a user with a messenger chat window including the generated SMS transmission area; displaying a received message in a display area of the messenger chat window when a message is received through an input area of the messenger chat window from the user; calculating a capacity of the selected message; performing a predetermined different process for the selected message on the basis of the calculated message capacity; and transmitting the SMS message including the predetermined processed message.

According to yet another aspect of the present invention, there is provided a system of transmitting an SMS message using a messenger, the system including: an SMS transmission area providing unit generating a predetermined SMS transmission area associated with SMS transmission and providing a user with a messenger chat window including the generated SMS transmission area; a first message display unit displaying a message in a display area of the messenger chat window when the message is received through an input area of the messenger chat window from the user; a message capacity calculation unit calculating a capacity of the selected message when the displayed message is selected by the user and dividing the displayed message into a plurality of messages according to a predetermined reference capacity when the message capacity exceeds the reference capacity; a second message display unit displaying the divided message and the divided message capacity in the input area; and an SMS transmission unit transmitting the SMS message including the divided message when a request for transmitting the divided message is received from the user.

BEST MODE FOR CARRYING OUT THE INVENTION

Hereinafter, a method of transmitting an SMS using a messenger and a system using the method will be described by referring to the attached figures.

Figure 1:
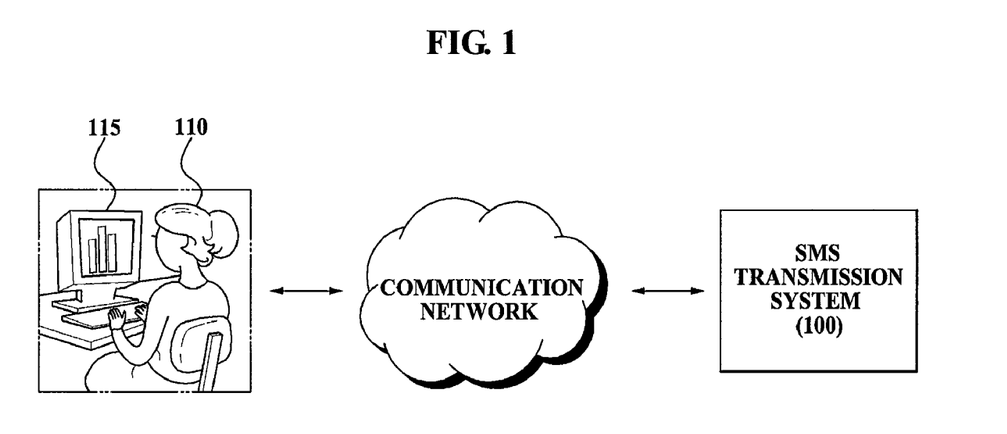
FIG. 1 is a diagram illustrating a network connection of an SMS transmission system according to an embodiment of the present invention.

FIG. 1 is a diagram illustrating a network connection of an SMS transmission system according to an embodiment of the present invention.

The SMS transmission system 100 provides a user 110 with a messenger chat window, and when a predetermined message is received through the messenger chat window from the user 110, displays the received message in a display area of the messenger chat window, calculates a capacity of a selected message when the displayed message is selected by the user 110, divides the message into a plurality of messages according to a predetermined reference capacity when the message capacity exceeds the reference capacity, displays the divided messages, and transmits the message by the SMS transmission system 100.

The user 110 may have a terminal 115 in order to connect to the SMS transmission system 100, the messenger chat window is provided through the user terminal 115, a message is received through the messenger chat window, and an SMS transmission is requested after a message to be transmitted is selected among the received message.

The user terminal 115 is equipped with a microprocessor and a memory device, and may include a desktop PC (personal computer), a notebook PC, a PDA (personal data assistant), and a mobile terminal, and thus, the user terminal 115 has a functional capability and may be any type of device which can be connected in a wired and a wireless communication network.

Figure 2:
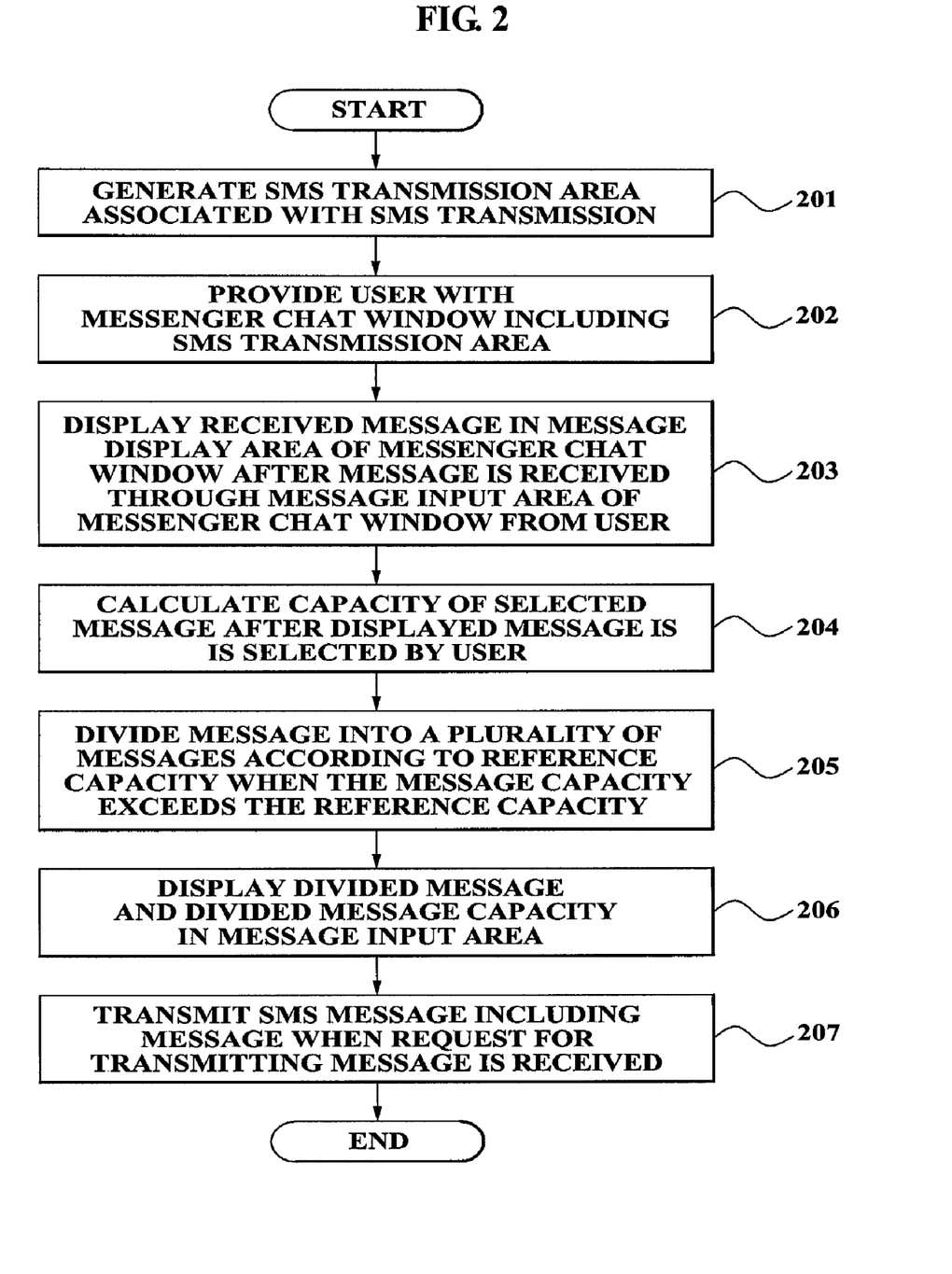
FIG. 2 is a flowchart illustrating a method of an SMS transmission using a messenger according to an embodiment of the present invention.

FIG. 2 is a flowchart illustrating a method of an SMS transmission using a messenger according to an embodiment of the present invention. The method of an SMS transmission according to an embodiment of the present invention may be performed by the SMS transmission system 100.

Initially, in operation 201, the SMS transmission system 100 generates a predetermined SMS transmission area associated with an SMS transmission. The predetermined SMS transmission area may include an input area for a number of a mobile terminal and an SMS transmission request button associated with a request for the SMS transmission.

In operation 202, the SMS transmission system 100 provides the user 110 with a messenger chat window. The messenger chat window may include a predetermined message input area, a message display area, and the SMS transmission area, and the user 110 may transmit and receive a message with a second user through the messenger chat window, and may transmit an SMS message including the message to any mobile terminals of the second user or a third user.

Figure 3:
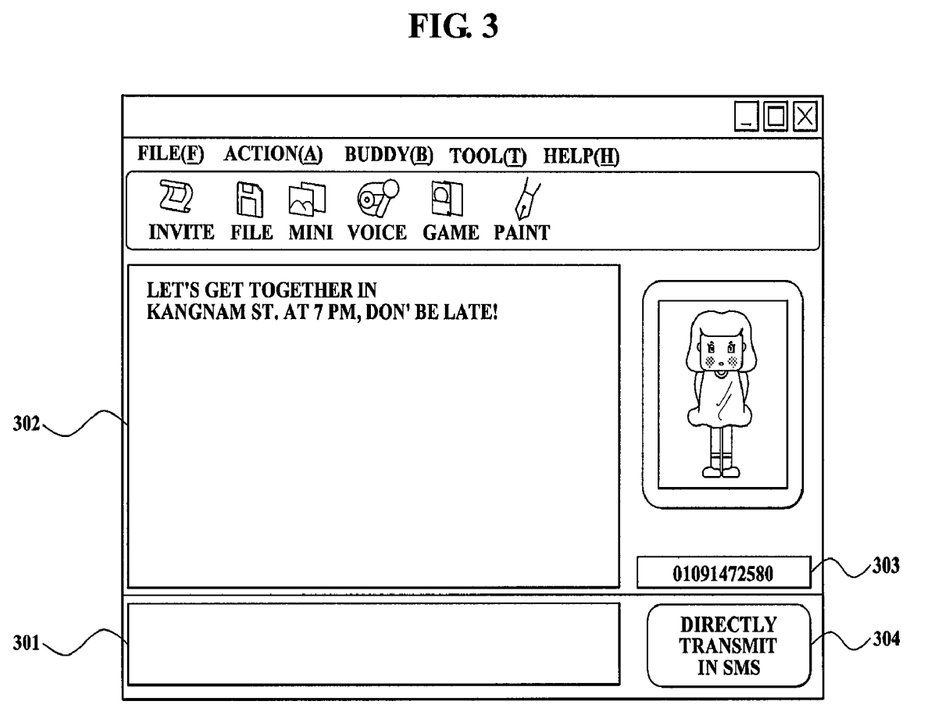
FIG. 3 is a diagram illustrating an embodiment of a messenger chat window according to an embodiment of the present invention.

Below, the messenger chat window will be described to FIG. 3. FIG. 3 is a diagram illustrating an embodiment of a messenger chat window according to an embodiment of the present invention.

As illustrated in FIG. 3, the messenger chat window provided in the SMS transmission area may include a message input area 301 for inputting a message from the user, a message display area 302 displaying the received message, a number input area 303 for inputting a number of a predetermined mobile terminal, and an SMS transmission request button 304 for requesting the SMS transmission. The user 110 inputs the number of the mobile terminal of a receiver to receive the SMS in the input area 303, and after the number of the mobile terminal is input, the SMS transmission request button 304 is clicked, and subsequently the SMS transmission is requested and the SMS transmission system 100 transmits the SMS message to the mobile terminal of which it's number is input in the number input area 303 when the SMS transmission system 100 receives a request for the SMS transmission from the user 110.

The number of the mobile terminal of a receiver is directly input by the user 110 or in the case the user 110 appoints the receiver, the SMS system 100 may automatically input a number of the mobile terminal of the appointed receiver.

In operation 203, when a message is received through the message input area 301 of the messenger chat window from the user 110, the SMS transmission system 100 displays the received message in the message display area 302 of the messenger chat window. As an example, once again FIG. 3 is referred to here, the user 110 inputs a message in the message input area 301 of the messenger chat window and after the message is input, the received message may be displayed in the message display area 302.

In operation 204, when the displayed message in the display area is selected by the user, the SMS transmission system 100 calculates a capacity of a selected message.

Namely, when the user 110 locates a mouse in the message display area 302, a predetermined area including a message may be selected, when a click of the mouse for the selected area is received, a capacity of the message included in the selected area may be calculated. Generally, an SMS system can transmit approximately 40 characters of Korean at one time per transmission, that is, a message capacity of approximately 80 KB. As an example, after calculating a capacity of a selected message, whether the message capacity exceeds approximately 80 KB of a reference capacity for a one time transmission is determined.

Figure 4:
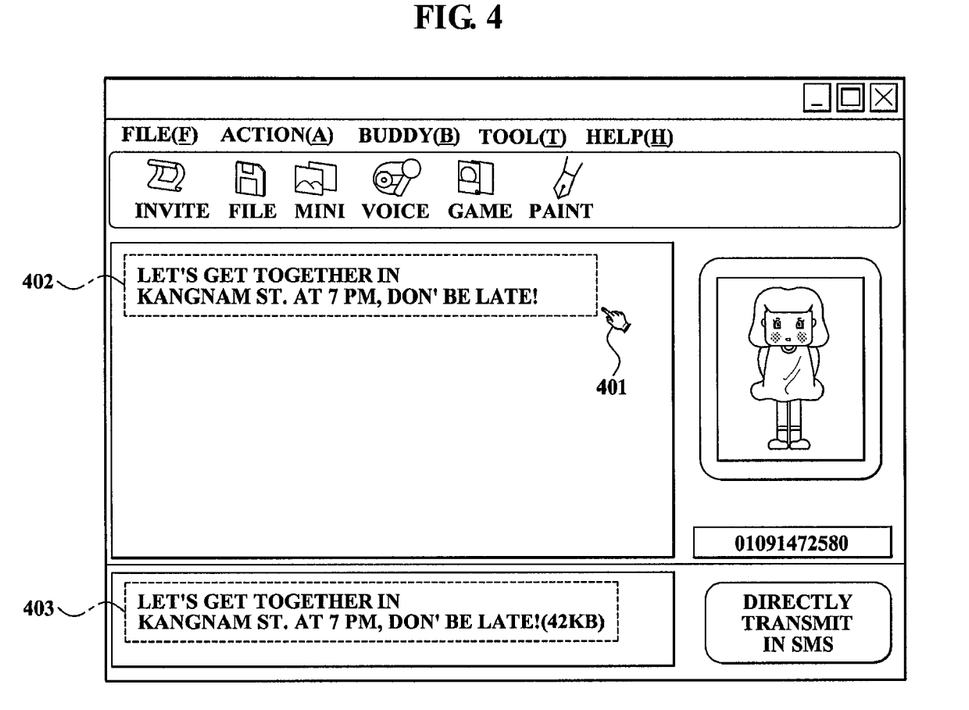
FIG. 4 is a diagram illustrating an embodiment of selecting a message displayed in a displayed area according to an embodiment of the present invention.

Below, a selecting process of the user 110 for a message displayed in the messenger chat window will be described by referring to FIG. 4. FIG. 4 is a diagram illustrating an embodiment of selecting a message displayed in a message display area according to an embodiment of the present invention.

As illustrated in FIG. 4, once a message is received through a message input area 403 from a user, the received message is displayed in a display area of the messenger chat window, and when the user locates a mouse 401 in an area associated with a message to be selected, an area 402 including the displayed message in the display area may be selected. The selected message may be displayed in another type of font, another font color or highlighted in a predetermined color in the selected area in order to distinguish from an unselected message.

As described above, after the message is selected, when the user clicks the selected message, the SMS transmission system 100 calculates the capacity of the selected message. As an example, in the case the selected message is "Let's get together in Kang Nam Station at 7 o'clock, don' be late!", the capacity of the selected message is approximately 42 KB.

In operation 205, the SMS transmission system 100 divides the message into a plurality of messages according to a reference capacity when the message capacity exceeds the reference capacity. Generally, an SMS system can transmit approximately 40 characters of Korean at one time per transmission, that is, a message capacity of approximately 80 KB. As an example, the reference capacity may be a maximum capacity of approximately 80 KB for a one time transmission.

When the calculated message capacity exceeds the reference capacity, the selected message is divided into a plurality of messages according to the reference capacity, and when the messages is divided, a predetermined different process may be performed for each of the divided message. As an example, the divided messages may be displayed in another type of a font, in another font color, or highlighted in a predetermined color.

In operation 206, the SMS transmission system 100 displays the divided messages and the divided message capacities in the message input area 301. A capacity of the plurality of divided messages may be calculated according to the divided message capacities and the divided messages and the divided message capacities may be simultaneously displayed together in the message input area 301 of the messenger chat window.

Figure 5:
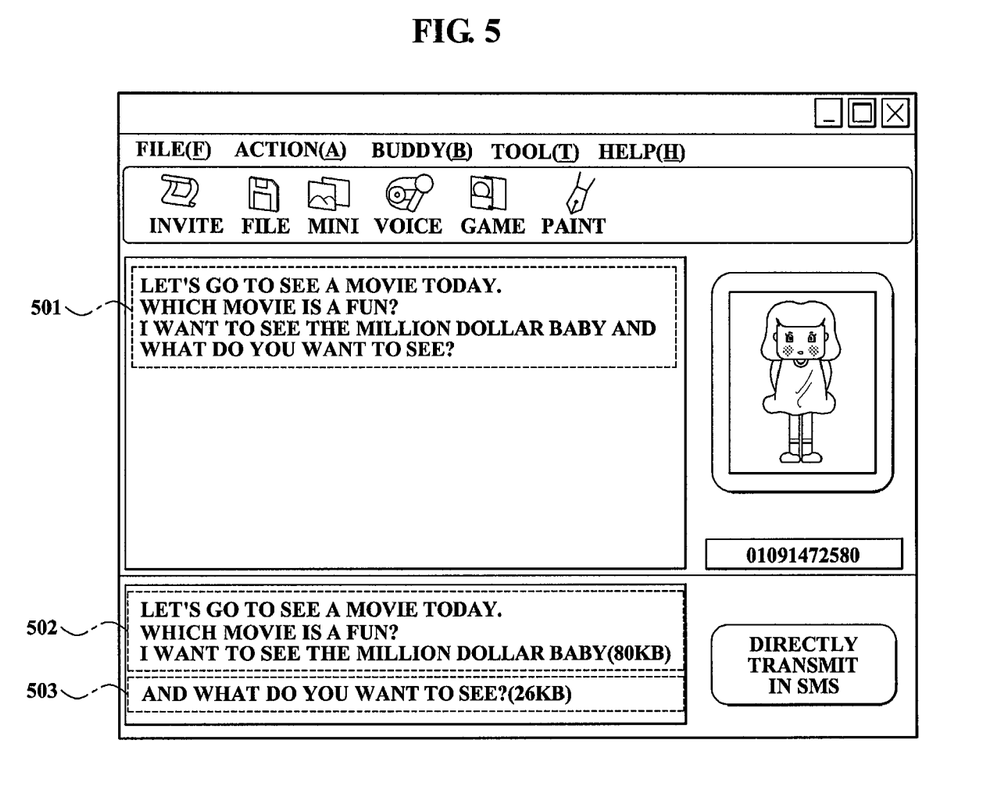
FIG. 5 is a diagram illustrating another embodiment of displaying a divided message according to an embodiment of the present invention.

Below, the divided messages according to the reference capacity will be described by referring to FIG. 5. FIG. 5 is a diagram illustrating an embodiment of displaying a divided message according to an embodiment of the present invention.

As illustrated in FIG. 5, when a user selects a message 501 displayed in a message display area of a messenger chat window, a capacity of the selected message 501, is calculated to be approximately 106 KB. Since the calculated message capacity is approximately 106 KB, which exceeds approximately 80 KB of a reference capacity, the selected message 501 may be divided into a plurality of messages in order to not exceed the reference capacity. As an example, as shown in FIG. 5, the selected message as follow, "Let's go to see a movie today. Which movie is a fun? I want to see the Million Dollar Baby and what do you want to see?" is divided into two messages, approximately 80 KB of "Let's go to see a movie today. Which movie is a fun? I want to see the Million Dollar Baby" 502 and approximately 26 KB of "And what do you want to see?" 503.

The divided messages 502 and 503 may be displayed in another type of font, another font color, or highlighted in a predetermined color in the selected area in order to distinguish from an unselected message. Accordingly, a user may readily check how many messages the selected message is divided into, whether an SMS transmission is possible, the number of SMS transmissions, and an SMS transmission fee due to the divided and displayed messages in an input area.

Also, the SMS transmission system 100 according to the present invention displays the selected message and the calculated message capacity in the input area when the calculated message capacity does not exceed the reference capacity. As an example, referring to FIG. 4 again, when the message selected by the user "Let's get together in Kang Nam Station at 7 o'clock, don' be late!" does not exceed approximately 80 KB of the reference capacity, as 403 shown in FIG. 4, the message is not divided and the message is directly displayed together with a capacity of the selected message in the input area of the messenger chat window.

Finally, in operation 207, the SMS transmission system 100 transmits an SMS message including the message when a request for transmitting the message is received from the user.

After the selected message from the user is displayed in an input area and the request for transmitting the message is received, the SMS message including the message may be transmitted. Namely, when the request for the transmitting the message is received, the user may input a number of a mobile terminal of a receiver to receive the SMS message in a number input area of the mobile terminal, after the number of the mobile terminal is input, the request for the SMS transmission is completed by clicking a button associated with the request for the SMS transmission. The number input area for the number of the mobile terminal and the button associated with a request for the SMS transmission has been sufficiently described with reference to FIG. 3 and the description of FIG. 3, so that a further description regarding the number input area and the button will be omitted hereinafter.

In this case, when the selected message by the user does not exceed a reference capacity, an SMS transmission is performed one time, and when the selected message exceeds the reference capacity and the selected message is divided into a plurality of messages, the SMS message may be repeatedly transmitted a number of times the message is divided into. When the divided messages are transmitted, the messages may be transmitted in sequentially or simultaneously transmitted.

Figure 6:
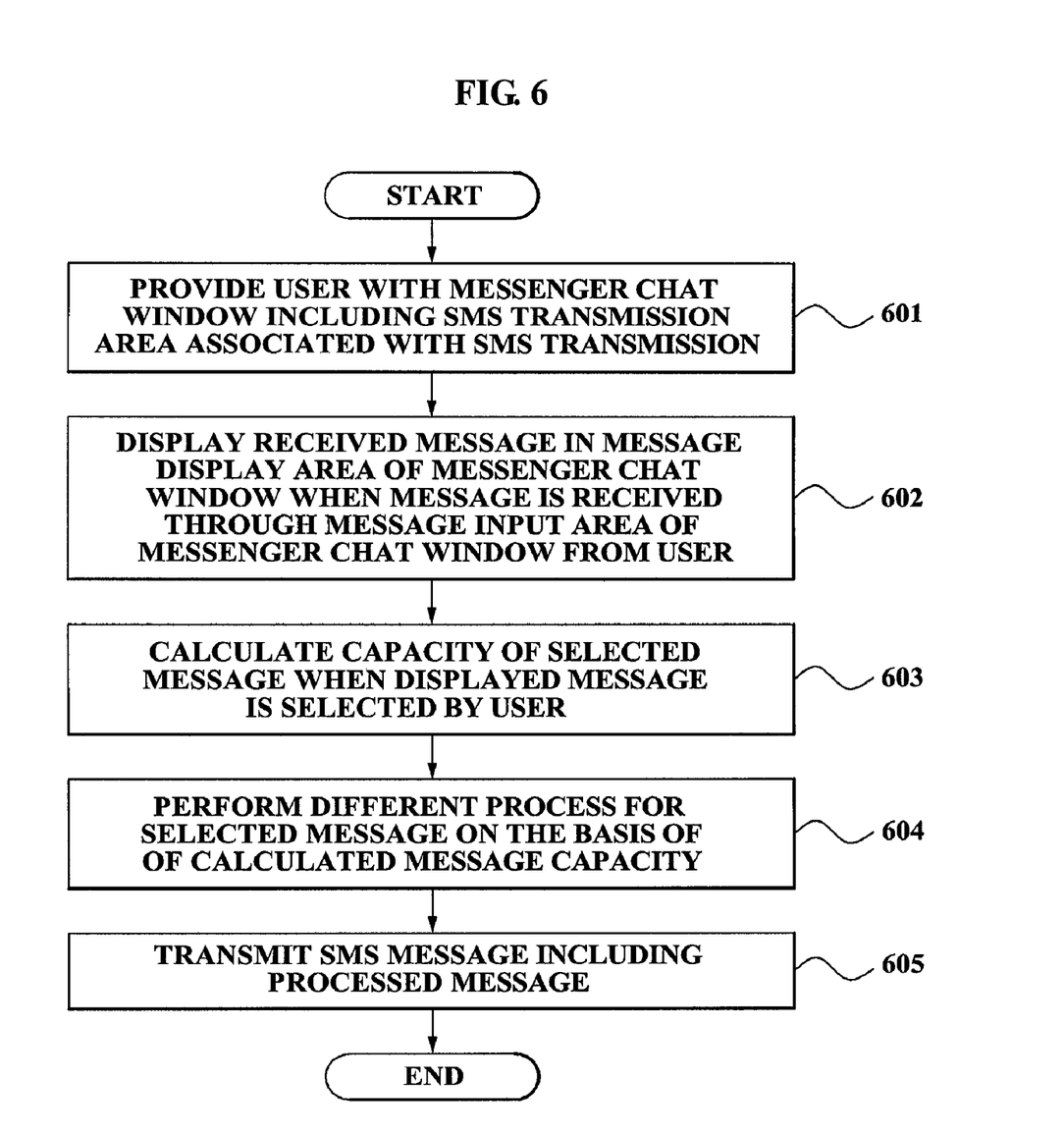
FIG. 6 is a flowchart illustrating a method of an SMS transmission using a messenger according to another embodiment of the present invention.

Hereinafter, a method of an SMS transmission using a messenger according to another embodiment of the present invention by referring to FIG. 6 will be described.

Initially, in operation 601, the SMS transmission system 100 provides a user with a messenger chat window including an SMS transmission area associated with an SMS transmission. The transmission area may include an input area for a number of a mobile terminal and an SMS transmission request button associated with a request for the SMS transmission.

In operation 602, when the SMS transmission system 100 receives a message through the message input area of the messenger chat window from the user, the SMS transmission system 100 displays the received message in the message display area of the messenger chat window.

In operation 603, the SMS transmission system 100 calculates a capacity of the selected message when the displayed message is selected by the user.

The selection for the message is performed when a mouse is located in a predetermined area associated with the message, and when a click of the mouse for the selected area is received from the user, a capacity of a message included in the selected area may be calculated.

In operation 604, the SMS transmission system 100 performs a predetermined different process for the selected messages on the basis of the calculated message capacity.

Namely, the performing of the predetermined process divides the message into a plurality of messages according to a predetermined reference capacity when the message capacity exceeds the reference capacity, and displays a plurality of the divided message and the divided message capacity in the input area, and displays the selected message and the calculated message capacity in the input area when the message capacity does not exceed the reference capacity.

In operation 605, the SMS transmission system 100 transmits an SMS message including the predetermined processed message. When the selected message by the user does not exceed a reference capacity, an SMS transmission is performed at one time, and when the selected message exceeds the reference capacity and the selected message is divided into a plurality of messages, the SMS message may be repeatedly transmitted a number of times the message is divided into.

Below, an SMS transmission system according to the present invention will be described by referring to FIG. 7 and FIG. 8.

Figure 7:
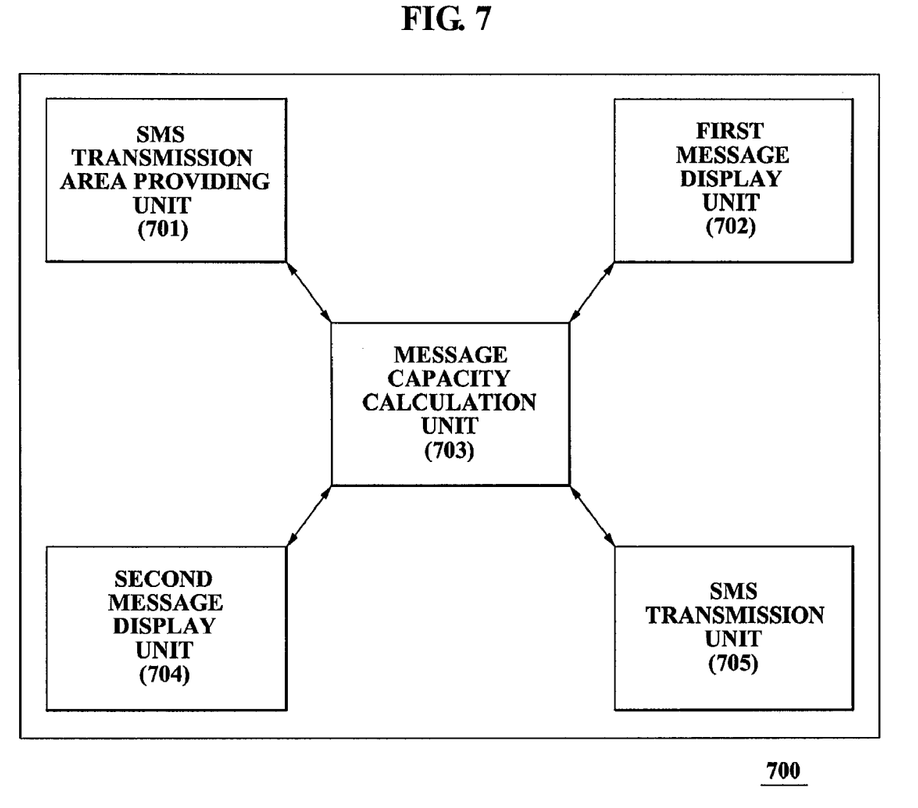
FIG. 7 is a diagram illustrating an internal configuration of the SMS transmission system according to an embodiment of the present invention.

FIG. 7 is a diagram illustrating an internal configuration of the SMS transmission system according to an embodiment of the present invention.

As illustrated in FIG. 7, the SMS transmission system includes an SMS transmission area providing unit 701, a first message display unit 702, a message capacity calculation unit 703, a second message display unit 704, and an SMS transmission unit 705.

The message transmission area providing unit 701 generates a predetermined SMS transmission area associated with SMS transmission and provides a user with a messenger chat window including the generated SMS transmission area. The messenger chat window may include a message input area, message display area and the SMS transmission area, and the SMS transmission area may include an input area for a number of a mobile terminal and an SMS transmission request button associated with a request for the SMS transmission.

The first message display unit 702 displays a message in a display area of the messenger chat window when the message is received through an input area of the messenger chat window from the user.

The message capacity calculation unit 703 calculates a capacity of the selected message when the displayed message is selected by the user, and divides the displayed message into a plurality of messages according to a predetermined reference capacity when the message capacity exceeds the reference capacity. When a mouse is located in the area, the message capacity calculation unit 703 selects a predetermined area associated with the message, and when a click of the mouse is received on the selected area, the message capacity calculation unit 703 calculates the message capacity included in the selected area.

The message display unit 704 displays the divided message and the divided message capacity in the input area. When the calculated message capacity exceeds a reference capacity, the selected message according to the reference capacity is divided into a plurality of messages, and when the messages is divided, a predetermined different process may be performed for each of the plural divided messages. As an example, the divided messages may be displayed in another type of a font, in another font color or highlighted in a predetermined color.

The SMS transmission unit 705 transmits an SMS message including the message when a request for transmitting the divided message is received from the user. After the selected message is displayed in a message input area, when a request for SMS transmission for the message is received, the SMS transmission unit 705 may transmit an SMS message including a predetermined processed message.

Figure 8:
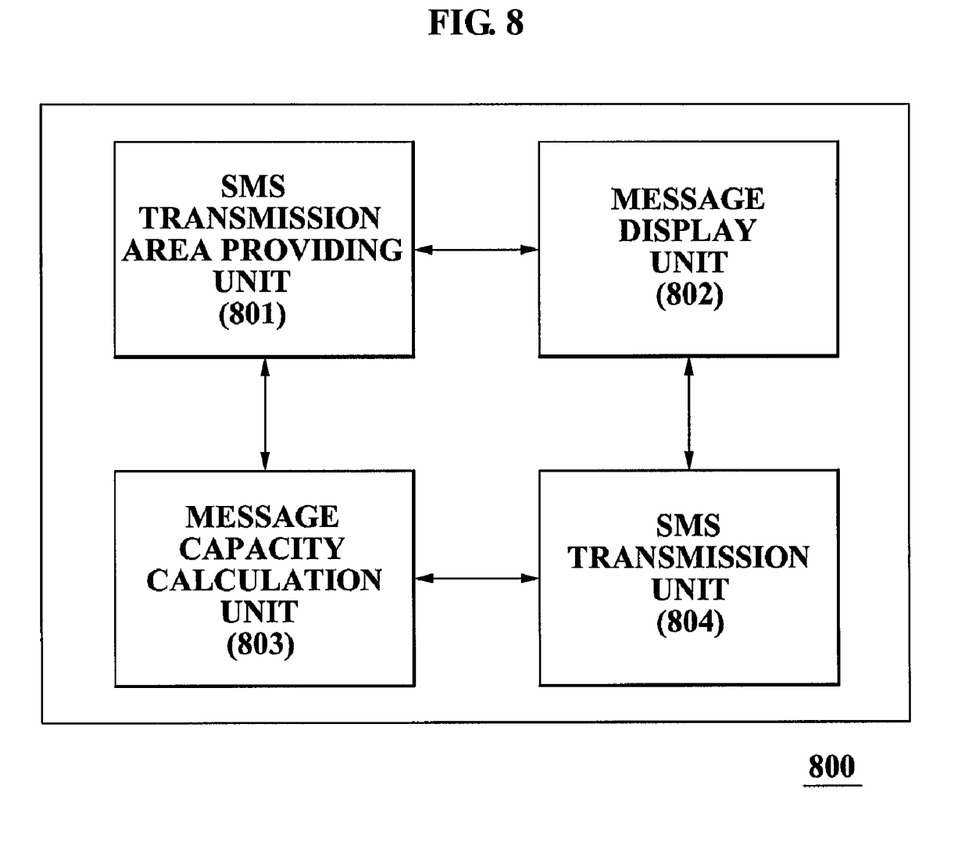
FIG. 8 is a diagram illustrating an internal configuration of a system of the SMS transmission according to another embodiment of the present invention.

FIG. 8 is a diagram illustrating an internal configuration of a system of the SMS transmission according to another embodiment of the present invention.

As illustrated in FIG. 8, an SMS transmission system 800 according to the present invention may includes an SMS transmission area providing unit 801, a message display unit 802, a message capacity calculation unit 803 and an SMS transmission unit 804.

The SMS transmission area providing unit 801 provides a user with a messenger chat window including a predetermined SMS transmission area associated with an SMS transmission. The transmission area may include an input area for a number of a mobile terminal and an SMS transmission request button associated with a request for the SMS transmission.

The message display unit 802 displays a message in a display area of the messenger chat window when the message is received through an input area of the messenger chat window from the user.

The message capacity calculation unit 803 calculates a capacity of the selected message when the displayed message is selected by the user, a predetermined different process may be performed for the selected message on the basis of the calculated message capacity. The message capacity calculation unit 803 selects the message when a mouse is located in a predetermined area associated with the message, and when a click of the mouse is received on the selected area, a message capacity of the selected message included in the selected area is calculated. When the message capacity exceeds the reference capacity, the message capacity calculation unit 803 divides the message into a plurality of messages according to a predetermined reference capacity, and displays the divided message and the divided message capacity in the input area, and when the message capacity does not exceed the reference capacity, the message capacity calculation unit 803 displays the selected message and the capacity of the selected message in the input area.

The SMS transmission unit 804 transmits an SMS message including a predetermined processed message. When the selected message by the user does not exceed a reference capacity, an SMS transmission is performed at one time, when the selected message exceeds the reference capacity and the selected message is divided into a plurality of messages, the SMS may be repeatedly transmitted a number of times the message is divided into.

The method of transmitting an SMS using a messenger according to the above-described embodiment of the present invention may be recorded in computer-readable media including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter. The hardware elements above may be configured to act as one or more software modules for implementing the operations of this invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to a method of transmitting an SMS using a messenger and a system using the method, the present invention can provide a user with a messenger chat window including an SMS transmission area; calculate a capacity of a selected message which has been received through the messenger chat window when a message is selected by the user; divide the selected message into a plurality of messages according to a predetermined reference capacity when the message capacity exceeds the reference capacity; and transmit the SMS message, and a system using the method.

Also, according to a method of transmitting the SMS message using a messenger and a system using the method, the present invention can transmit an SMS message even through a messenger chat window without logging into an additional SMS transmission window, so that user convenience is increased while transmitting the SMS message.

Also, according to a method of transmitting the SMS message using a messenger and a system using the method, the present invention can divide a message into a plurality of messages according to a predetermined reference capacity when the message exceeds the reference capacity, and display the divided messages so that a user is able to readily check transmission times and transmission fees.

The invention claimed is:

1. A method for providing text communication service associated with a message service using a messenger, the method comprising:

providing a messenger window configured to receive a user input message and to send the message to a receiver via a network, the messenger window comprising a message input area and a message display area, wherein the message window is further configured to determine a size of the message;

providing the user with a selection tool comprising the mouse pointer to select a portion of the message, wherein the size of the selected portion of the message is calculated;

dividing the message into parts in response to the determination of the size of the selected message exceeding a size limit of a reference message corresponding to the message service; and transmitting the selected message in whole or in division according to the determination in response to the user's request for transmission.

2. The method of claim 1, wherein dividing the message further comprises displaying each of the divided messages in a different manner.

3. The method of claim 2, wherein the different manner comprises displaying in a different color or a different style.

4. The method of claim 1, further comprising:

providing an indicator capable of indicating the selected message being transmitted at a time.

5. A method for providing a short message service using a messenger, the method comprising:

providing a messenger window comprising a message input area and a message display area, the messenger window configured to send a message to a receiver via a network, wherein a user's input message is selected using a mouse pointer, the selected message being displayed in the message display area, wherein the mouse pointer is provided to select a portion of the message to be transmitted and the size of the selected portion of the message is calculated in comparison with the size limit of a reference message;

determining a size of the selected message by calculating the size based upon the size limit of the message, the size limit corresponding to the message service; and transmitting the selected message in whole or in division based on the calculation in response to the user's request for transmission, wherein the selected message comprising a portion of the entire message to be transmitted to the receiver.

6. The method of claim 5, wherein determining a size of the selected message comprises processing the selected message into parts according to the size limit of the reference message in response to detection of the size of the selected message exceeding the size limit of the reference message.

7. A non-transitory computer readable storage medium comprising an executable program, which when executed, performs the method of claim 1.

8. A system of providing a message service, the system comprising:

a transmission providing unit configured to generate a messenger window associated with the message service, wherein the messenger window comprises a message input area and a message display area, and wherein the message input area is configured to receive user input message and the message display area is configured to display a message being selected by the user;

a calculation unit configured to determine a size of the selected message being selected using a mouse pointer and to divide the selected message into parts in response to the determination of the size of the selected message exceeding a size limit of a reference message corresponding to the message service, wherein the calculation unit provides a selection area associated with the selected message in response to detection of a mouse locating to the selection area, and calculates the size of the selection area associated with the selected message associated with the mouse location; and a transmission unit configured to transmit the selected message in whole or in division according to the determination in response to the user's request for transmission, wherein the message display area displays each of the divided messages in different colors according to the determination.

9. A system, comprising:

a transmission providing unit configured to generate a messenger window associated with a message service, wherein the messenger window comprises a message input area and a message display area, and wherein the message input area is configured to receive user input messages and the message display area is configured to display the input messages being selected by the user, wherein a selection tool comprising the mouse pointer is provided to select a portion of the message;

a calculation unit configured to determine a size of the selected message by calculating the size of the selected message to be transmitted using the mouse pointer in comparison with a size limit of a reference message corresponding to the message service, wherein the calculation unit to provide a selection area associated with the selected message in response to detection of a mouse locating to the selection area; and a transmission unit configured to transmit the selected message in whole or in part according to the calculation in response to the user's request for transmission, wherein a message display area is configured to display each of the divided messages in different colors according to the determination.

10. A non-transitory computer readable storage medium comprising an executable program, which when executed, performs the method of claim 5.

* * * * *